(12) United States Patent
Cox et al.

(10) Patent No.: US 9,461,716 B2
(45) Date of Patent: Oct. 4, 2016

(54) NEAR FIELD COMMUNICATIONS (NFC) MODULATION FEEDBACK APPARATUS FOR TUNED ANTENNA CONFIGURATIONS

(71) Applicant: Intel IP Corporation, Santa Clara, CA (US)

(72) Inventors: Timothy F. Cox, Palo Alto, CA (US); Niranjan Karandikar, Campbell, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/635,564

(22) Filed: Mar. 2, 2015

(65) Prior Publication Data
US 2016/0261314 A1    Sep. 8, 2016

(51) Int. Cl.
*H04B 5/02* (2006.01)
*H04J 1/00* (2006.01)
*H04B 5/00* (2006.01)
*H04B 17/21* (2015.01)

(52) U.S. Cl.
CPC .............. *H04B 5/02* (2013.01); *H04B 5/0031* (2013.01); *H04B 17/21* (2015.01); *H04J 1/00* (2013.01); *H04M 2250/04* (2013.01)

(58) Field of Classification Search
CPC .................................................. G06K 19/0723
USPC ................................................ 455/41.1, 41.2
See application file for complete search history.

(56) References Cited

U.S. PATENT DOCUMENTS

| | | | | |
|---|---|---|---|---|
| 6,882,826 B2 * | 4/2005 | Hediger | ................ | H04L 1/0002 455/41.1 |
| 7,782,183 B2 * | 8/2010 | Wieser | ................ | B60C 23/0437 340/447 |
| 7,926,719 B2 * | 4/2011 | Spiess | .................. | G06K 7/0008 235/439 |
| 8,105,787 B2 * | 1/2012 | Bird | .................... | C12N 15/1034 422/50 |
| 8,203,430 B2 * | 6/2012 | Breitfuss | .............. | G06K 7/0008 340/10.1 |
| 8,373,544 B2 * | 2/2013 | Pitt-Pladdy | .......... | G06K 7/0008 340/10.1 |
| 8,831,512 B2 * | 9/2014 | Laws | .................. | H04B 5/0031 340/10.1 |
| 8,847,735 B2 * | 9/2014 | Gay | .................. | G06K 7/10237 340/10.1 |
| 8,879,988 B2 * | 11/2014 | McFarthing | ......... | H04B 5/0062 455/226.1 |
| 8,929,808 B2 * | 1/2015 | Marholev | ...................... | 330/259 |
| 8,965,279 B2 * | 2/2015 | Lefley | .................. | G06K 7/0008 340/10.1 |
| 9,038,896 B2 * | 5/2015 | Williams | ........... | G06K 7/10009 235/375 |
| 9,071,283 B2 * | 6/2015 | Shana'a | ............... | H04B 5/0031 |
| 9,154,192 B2 * | 10/2015 | Shana'a | ............... | H04B 5/0031 |
| 2007/0274242 A1 * | 11/2007 | Lamacraft | .......... | G06K 19/0723 370/310 |
| 2008/0076671 A1 * | 3/2008 | Bird | .................... | C12N 15/1034 506/9 |
| 2008/0223931 A1 * | 9/2008 | Spiess | .................. | G06K 7/0008 235/439 |
| 2009/0224899 A1 * | 9/2009 | Wieser | ................ | B60C 23/0437 340/444 |
| 2010/0007467 A1 * | 1/2010 | Breitfuss | .............. | G06K 7/0008 340/10.1 |
| 2010/0134256 A1 * | 6/2010 | Mihota | .................. | H04B 3/142 340/10.1 |
| 2011/0156640 A1 * | 6/2011 | Moshfeghi | .............. | H02J 7/025 320/108 |
| 2011/0243277 A1 * | 10/2011 | Noel | .................... | H04L 27/0014 375/334 |
| 2012/0003930 A1 * | 1/2012 | Lefley | .................. | G06K 7/0008 455/41.1 |
| 2013/0084799 A1 * | 4/2013 | Marholev | ........... | H03F 3/45641 455/41.1 |

(Continued)

*Primary Examiner* — Hai V Nguyen
(74) *Attorney, Agent, or Firm* — Forefront IP Lawgroup, PLLC

(57) ABSTRACT

Described herein are architectures, platforms and methods for calibrating a near field communication (NFC) reader/writer device using a modulation feedback apparatus for tuned antenna configurations.

20 Claims, 5 Drawing Sheets

(56) References Cited

U.S. PATENT DOCUMENTS

| | | | |
|---|---|---|---|
| 2013/0326495 A1* | 12/2013 | Reunamaki | G06F 8/65 717/173 |
| 2013/0344805 A1* | 12/2013 | Lefley | H04B 5/0031 455/41.1 |
| 2014/0073241 A1* | 3/2014 | Luong | H04B 5/00 455/41.1 |
| 2014/0086301 A1* | 3/2014 | Akhavan | H04L 25/03828 375/238 |
| 2014/0170970 A1* | 6/2014 | McFarthing | H04B 5/0062 455/41.1 |
| 2014/0273830 A1* | 9/2014 | Wong | H04B 5/0031 455/41.1 |
| 2014/0323041 A1* | 10/2014 | Shana'a | H04B 5/0031 455/41.1 |
| 2014/0359060 A1* | 12/2014 | Lucas | G06F 17/30 709/217 |
| 2015/0053757 A1* | 2/2015 | Williams | G06K 7/10009 235/375 |
| 2015/0140929 A1* | 5/2015 | Lefley | G06K 7/0008 455/41.1 |
| 2015/0145676 A1* | 5/2015 | Adhikari | A61B 5/1123 340/539.32 |
| 2015/0256224 A1* | 9/2015 | Shana'a | H04B 17/12 455/41.1 |

\* cited by examiner

NEAR FIELD COMMUNICATIONS (NFC) MODULATION FEEDBACK APPARATUS FOR TUNED ANTENNA CONFIGURATIONS

BACKGROUND

In systems and devices implementing near field communication (NFC), an NFC reader/writer device may communicate with several NFC enabled cards/tags. Such NFC cards/tags may be passive, meaning that they have no power. In a typical implementation, the coupling between the passive NFC cards/tags and the NFC reader/writer device may power up the NFC cards/tags to perform an NFC transaction or communications.

As a particular distance and/or orientation (i.e., during coupling) of the NFC card/tag varies with respect to the NFC reader/writer device, an effective impedance or antenna loading at an antenna of the NFC reader/writer device antenna may also vary. Because the modulation index, for example, is dependent on the effective impedance or impedance loading of the antenna, then the modulation index may vary as a function of the NFC tag/card position, orientation, and/or electrical characteristics.

Given the additional radio frequency (RF) circuitry between the antenna and an NFC module of the NFC reader/writer device, the varying impedance loading at the antenna front end may not accurately reflect the modulation index and other modulation characteristics that are implemented at the NFC module. Previous solutions either suffer this inaccuracy when measured at a NFC reader/writer output pins (i.e., NFC module). When measurement is directly performed at the antenna, an additional antenna lead connection may be needed. As such, there is a need to provide a solution that addresses may the problem of an additional antenna lead connection to obtain the measurement of the modulation characteristics at the antenna of the NFC reader/writer device.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for using an NFC modulation feedback apparatus for tuned antenna configurations in a NFC reader/writer device. The described techniques facilitate calibration of an NFC controller or a NFC module such that an amount of modulation variation that is implemented at the NFC controller may be substantially the same as an amount of variation that is delivered at an NFC antenna. In other words, non-linear loading characteristics (i.e., impedance loading) at the NFC antenna due to distributed nature of NFC transmission channel, or due to physical orientation of an NFC card/tag (during a coupling configuration) may not affect the amount of modulation variation that is being implemented at the NFC controller side. That is, substantially the same modulation variation may be delivered or detected at the NFC antenna side in the implementations described herein.

For example, a direct modulation measurement circuitry may be disposed at the NFC antenna side in order to detect and measure a modulation characteristic (e.g., modulation index, low-frequency baseband signal, etc.) of a received modulated NFC carrier frequency signal from the NFC controller side. In this example, the measured modulation characteristic may be fed back using the same transmission channel or cable link (connection) that connects the NFC controller to the NFC antenna. Furthermore, a modulation measurement diplexer may be disposed at the NFC controller in order to separate the feedback signal from other frequency bands that may pass through the connection or cable link (e.g., NFC carrier frequency signal of 13.56 MHz).

In an implementation, a power amplifier disposed in between the NFC controller and the NFC antenna may be calibrated using a maximum impedance from the non-linear loading characteristics of the NFC antenna. In this implementation, the use of the maximum impedance may facilitate configuration of the power amplifier to avoid saturation, and as such the modulation characteristic may be efficiently implemented. For example, an electrical characteristic for different NFC cards/tags may provide different actual (impedance) loading in the power amplifier. In this example, the calibration of the power amplifier may be implemented by using the maximum impedance that may be created by the coupling NFC card/tag. This calibration of the power amplifier may be implemented along side the calibration of the NFC controller as described above.

Figure 1:
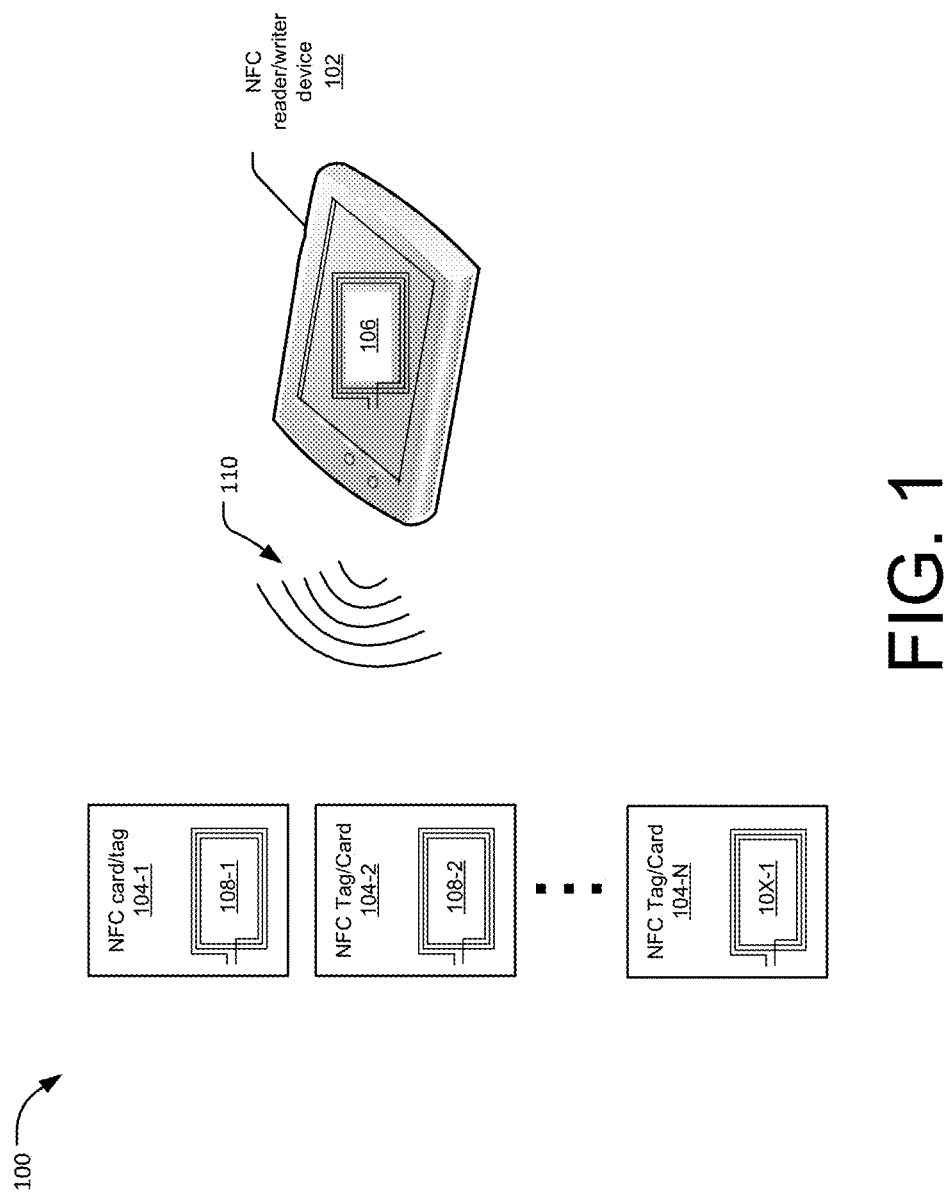
FIG. 1 is an example scenario illustrating a near field communication (NFC) reader/writer device communicating with one or more NFC cards/tags as described in implementations herein.

FIG. 1 is an example scenario 100 that illustrates a near field communication (NFC) reader/writer device 102 communicating with one or more NFC cards/tags 104. The NFC cards/tags 104 may be passive or active (i.e., not powered or powered). The NFC reader/writer device 102 includes an antenna 106, which may be part of/or connected to an NFC controller or module (not shown) in the NFC reader/writer device 102.

The NFC cards/tags 104 may include respective antennas 108. As shown, the antenna 106 of the NFC reader/writer device 102 may transmit a magnetic field or an RF field 110. As an NFC card/tag 104 enters the RF field 110, an impedance loading at the antenna 106 is created and this impedance loading may be utilized for calibration of a power amplifier (not shown) that may be disposed in the NFC controller or module. For example, the impedance loading includes different amounts of impedance that correspond to different electrical characteristic and/or physical orientations of the coupling NFC card/tag 104. In this example, a maximum impedance that correspond to a particular type of NFC card/tag 104 may be utilized to set a linear operation of the power amplifier. In other words, the power amplifier may be configured not to saturate at maximum impedance, which may affect efficiency of operations of the NFC reader/writer 102 as further discussed below.

With continuing reference to FIG. 1, the NFC controller or module of the NFC reader/writer device 102 may be calibrated by directly measuring a modulation characteristic (not shown) over its front-end antenna 106. The measured modulation characteristic, for example, may be fed back to the NFC controller or module and used for calibration and/or NFC Forum certification purposes.

Figure 2:
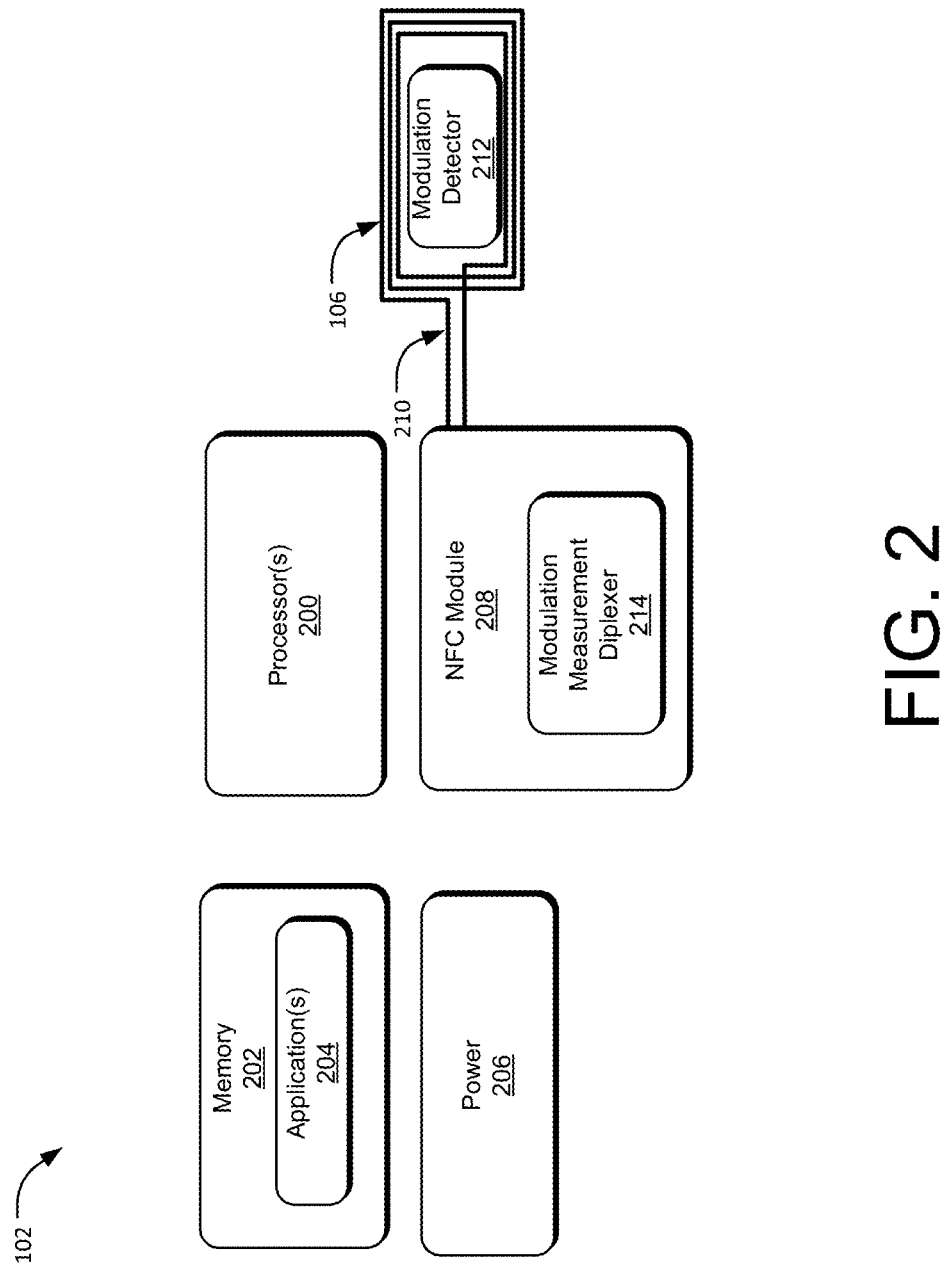
FIG. 2 is an example block diagram of a near field communication (NFC) reader/writer device as described in implementations herein.

FIG. 2 shows an example NFC reader/writer device 102 as described in present implementations herein. For example, the NFC reader/writer device 102 may utilize an impedance loading created by the coupling NFC cards/tags 104 for calibration. Furthermore, the NFC reader/writer device 102 may be configured to perform direct modulation measurement at its front-end antenna 106 side to implement appropriate transmitter modulation control corrections as further discussed below. In this example, the NFC reader/writer device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. The NFC reader/writer device 102 may further include, but is not limited to, non-portable devices such as a personal computer, nor limited to wireless devices such as when connected through a cable/connection.

The NFC reader/writer device 102 may include one or more processors 200, and a memory 202 coupled to the one or more processors 200. Memory 202 may be a non-transitory memory/media that includes various types of storage, including read only, random access and the like. Memory 202 may also include programming/non-programmable firmware. Particular elements described herein as hardware may be implemented in firmware as part of memory 202. Memory 202 may particularly include applications 204 which may be NFC enabled software/firmware applications.

The NFC reader/writer device 102 may include a power component 206. Power component 206 may include various AC and/or DC elements, such as batteries. Power component 206 drives and provides power to various other components of NFC reader/writer device 102, including power amplifiers (not shown).

The NFC reader/writer device 102 may include an NFC controller or NFC module 208. The NFC module 208 may be configured to communicate with other NFC enabled devices, including NFC card/tag 104. The NFC module 208 may be connected to the antenna 106 through a connection or cable link 210. For calibration purposes, for example, the NFC module 208 may send an initial modulated NFC carrier frequency signal to the antenna 106 through the connection or cable link 210. The antenna 106, in this example, may include a modulation detector 212 configured to measure or detect a modulation characteristic of the received initial modulated NFC carrier frequency signal. The modulation characteristic, for example, includes a measured modulation index, demodulated low-frequency baseband signal, and the like.

With the measured modulation characteristic, the same connection or cable link 210 may be used to feed back the measured modulation characteristic to the NFC module 208 for calibration and/or NFC Forum certification purposes. For example, the NFC module 208 may include a modulation measurement diplexer 210 that separates a feedback channel for the measured modulation characteristic from other frequency bands or channels that may utilize or operate in the connection or cable link 210. In this example, there is no need to add an additional cable link (connection) or other transmission channel for the calibration of the NFC reader/writer device 102.

The NFC module 208 may utilize the received measured modulation characteristic for comparison of modulation variation, modulation index, and appropriate transmitter modulation control corrections.

Figure 3:
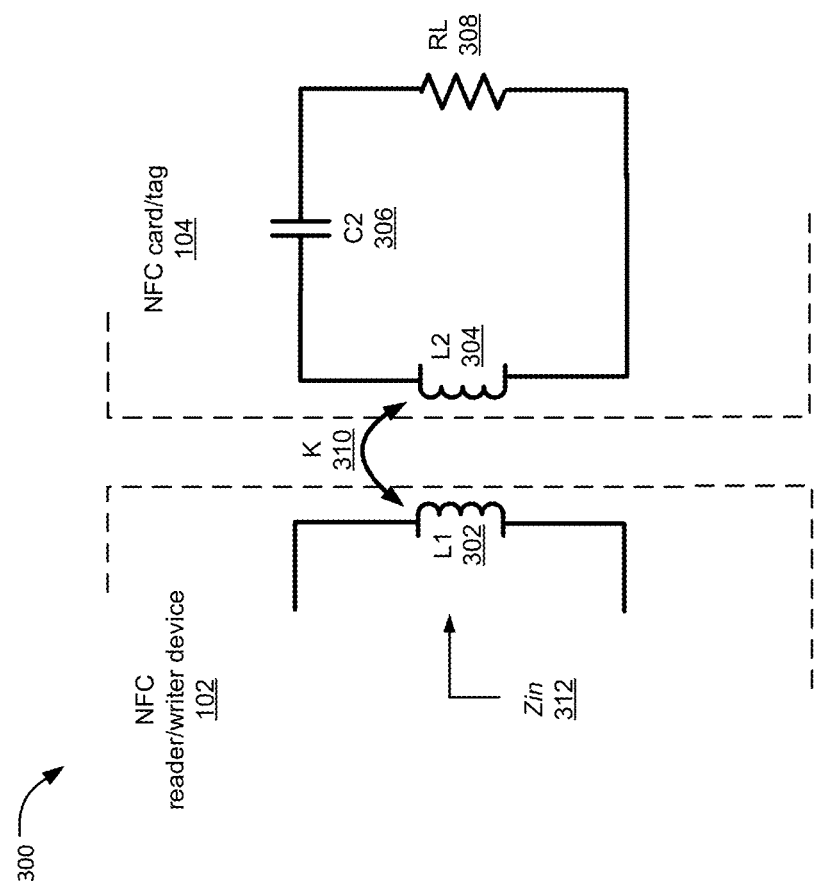
FIG. 3 is an example coupled coil system between a near field communication (NFC) reader/writer device and NFC card/tag as described in present implementations herein.

FIG. 3 shows an example coupled coil system 300 between NFC reader/writer device 102 and NFC card/tag 104. The coupling of the NFC card/tag 104 with the antenna 106 may create impedance loading at the antenna 106. The impedance loading, for example, may be measured by an impedance bridge that consumes very low power compared to the use of power amplifiers. A power amplifier (not shown) used for transmission may need to be turned on when actual transmission occurs between the NFC reader/writer device 102 and NFC card/tag 104.

As shown, inductor L1 302 represents the antenna 106 of NFC reader/writer device 102. An equivalent circuit of NFC card/tag 104 is represented by inductor L2 304, capacitor C2 306, and resistor RL 308. Inductor L2 304 may be considered as the antenna 108 of NFC card/tag 104. The capacitor C2 306 may be used to tune the antenna 108 (i.e., inductor L2 304) to a frequency of about 13.56 MHz, the operating frequency of NFC communication. RL 308 represents a load on the antenna 108 (i.e., inductor L2 304) of NFC card/tag 104.

Coupling between the two antennas 106 and 108 (i.e., inductors 302 and 304) may be represented by coupling coefficient K 310. Zin 312 is the input impedance and is derived by following Equation 1.

$$Zin = Z1 + \frac{\omega^2 K^2 L1 L2}{RL} \qquad \text{Equation 1}$$

For NFC cards/tags 104 that implement a parallel tuned configuration, Zin 312 may be derived by the following Equation 2.

$$Z_{in} = K^2 \frac{L1 \cdot RL}{L2} + (1 - K^2) Z1 \qquad \text{Equation 2}$$

Z1 is the impedance of the antenna 106 (i.e., inductor L1 300). Equations 1 and 2 illustrate that input impedance Zin 312 increases as the coupling coefficient K 310 increases between the two antennas 106 and 108 (i.e., inductors 302 and 304), which translates to a decrease in distance between the two antennas 106 and 108 (i.e., inductors 302 and 304). Therefore, a power amplifier (not shown) may be calibrated for linear operation using maximum value of Zin 312 that may be provided by the NFC cad/tag 104. The linear operation, for example, avoid saturation of the power amplifier that may affect the modulation characteristic during NFC transaction or function between the NFC card/tag 104 and the NFC reader/writer device 102.

Figure 4:
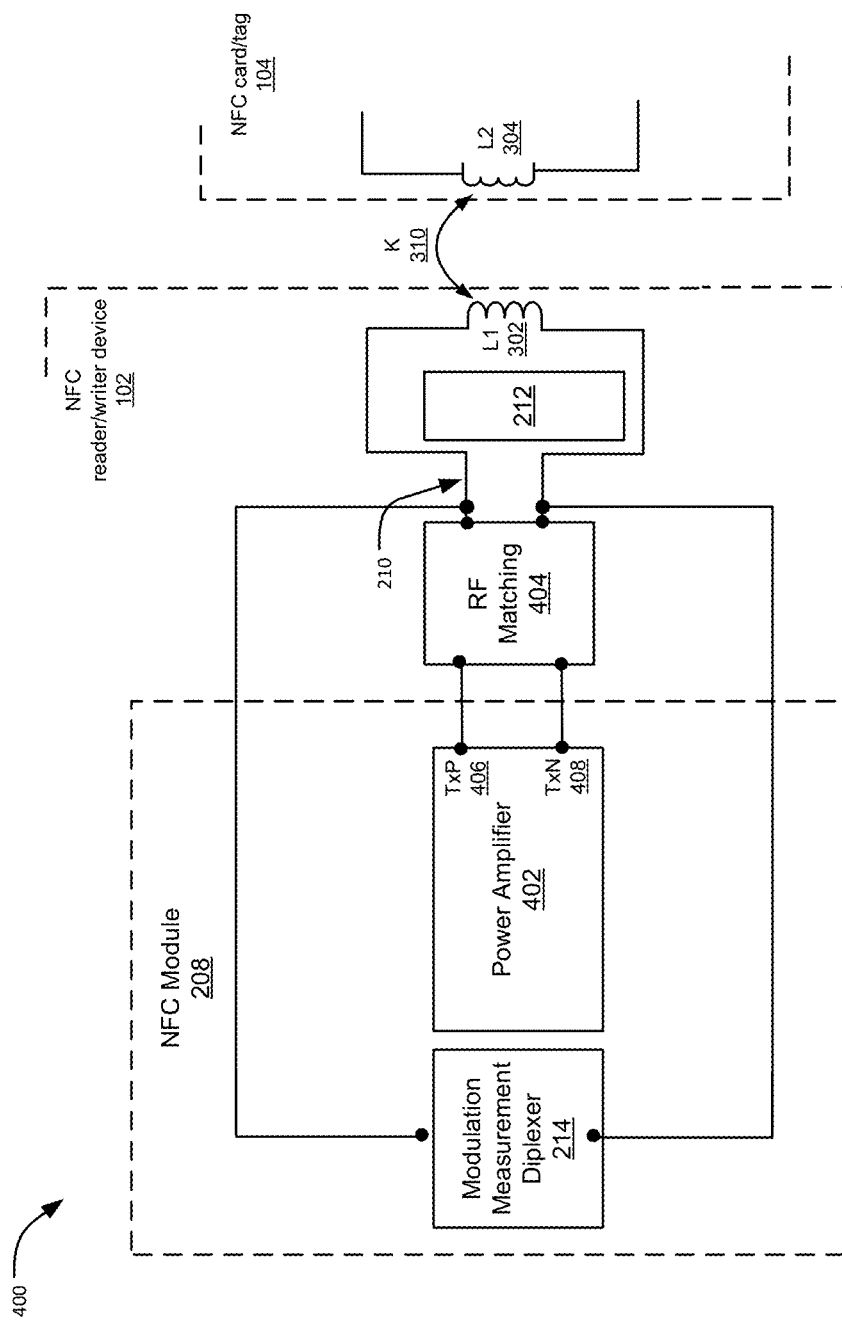
FIG. 4 is an example near field communication (NFC) coupling architecture between an NFC reader/writer device and the NFC card/tag as described in present implementations herein.

FIG. 4 shows an example NFC coupling architecture 400 between the NFC reader/writer device 102 and the NFC card/tag 104. As shown, the NFC module 208 may include a power amplifier 402 that may be calibrated based on the maximum loading impedance that is generated by the particular electrical characteristic of the NFC card/tag 104. For example, NFC Forum certifications allow different electrical characteristics that correspond to different types of NFC card/tag 104. In this example, the coupling of the NFC card/tag 104 with the antenna 106 (i.e., L1 302) may create a corresponding different impedance loading as well.

To avoid saturation with a given maximum impedance loading, the power amplifier 402 may be configured to be linear for the given maximum impedance loading. Thereafter, the calibration at the NFC module 208 as described in FIG. 2 above may be implemented. Particularly, the modulation detector 212 may detect the modulation characteristic of the received modulated NFC carrier frequency signal and afterward, the measured modulation characteristic is fed back to the NFC module 208 through the same connection or cable link 210.

With continuing reference to FIG. 4, an RF matching network 404 matches the impedance of the antenna 106 (i.e., inductor L1 300) to an output impedance of the power amplifier 402. As noted above, the maximum impedance loading at the antenna 106 may be utilized to calibrate the power amplifier 402. The reason being, the modulation index, for example, that is being transmitted by the NFC module 208 may be distorted when it passes through a distorted power amplifier 402 (if not properly calibrated).

In an implementation, the RF matching network 404 is a band-pass filter that may allow the 13.56 MHz NFC carrier frequency signal to pass through (i.e., from the NFC module 208 to the antenna 106). However, the RF matching network 404 may provide high insertion losses to low-frequency baseband signal that may be fed back from the antenna 106. To this end, the modulation measurement diplexer 214 may be used to facilitate the receiving of the low-frequency baseband signal by the NFC module 208. As described above, the NFC module 208 may utilize the received low-frequency baseband signal for pulse amplitude modulation (PAM) level comparisons, modulation index variation determination, appropriate transmitter modulation control compensation/corrections, and the like.

The RF matching network 404, as shown, may be connected to the power amplifier 402 by connection links TxP 406 and TxN 408.

Figure 5:
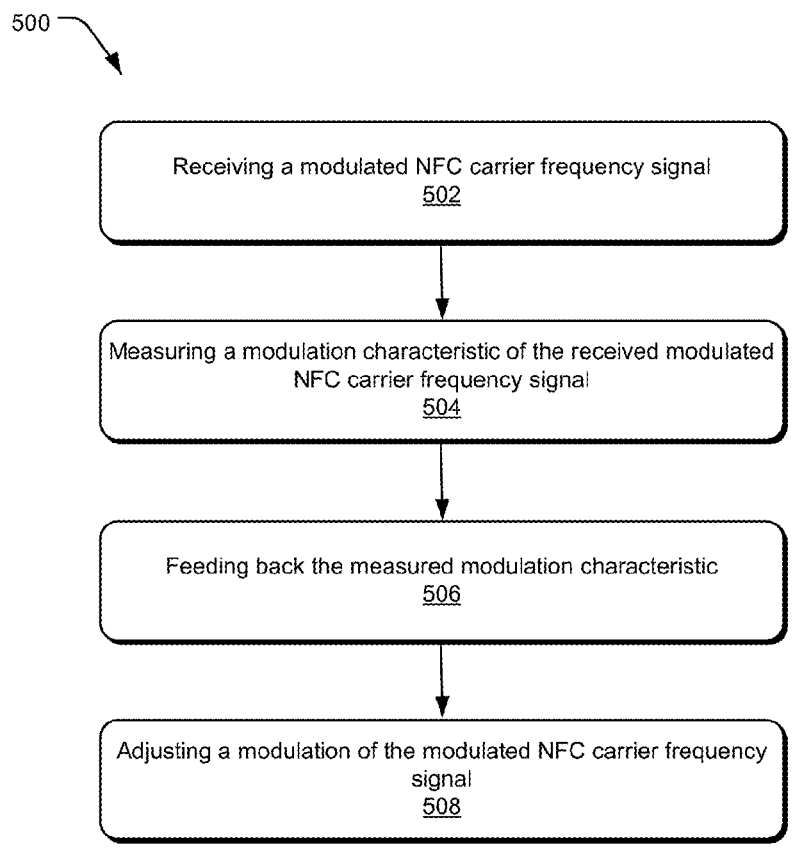
FIG. 5 is an example flow chart illustrating an example method for using a near field communication (NFC) modulation apparatus for tuned antenna configurations.

FIG. 5 shows an example process chart 500 illustrating an example method for using a NFC modulation feedback apparatus for tuned antenna configurations. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, receiving a modulated NFC carrier frequency signal through a connection or cable link by an NFC antenna is performed. For example, the connection or cable link 210 connects the NFC antenna 106 to the NFC controller or NFC module 208. In this example, the NFC module 208 is configured to produce an initial modulated NFC carrier frequency signal that passes through the connection or cable link 210 and received by the NFC antenna 106 for calibration or NFC Forum certification purposes.

At block 504, measuring a modulation characteristic of the received modulated NFC carrier frequency signal at the NFC antenna is performed. For example, a modulation detector 212 is integrated in the NFC antenna 106. In this example, the modulation detector 212 may be configured to measure the modulation characteristic such as a modulation index of the received modulated NFC carrier frequency signal. Furthermore, the modulation detector 212 may measure or demodulate the low-frequency baseband signal that modulated the NFC carrier frequency signal.

At block 506, feeding back the measured modulation characteristic through the connection or cable link is performed. For example, the measured modulation index, low-frequency baseband signal, etc. are fed back to the NFC module 208 through the same connection or cable link 210 that delivered the initial modulated NFC carrier frequency signal to the NFC antenna. In this example, the connection or cable link 210 is utilized for frequency multiplexing such that the measured low-frequency baseband signal may be fed back using the same connection or cable link 210 that delivered the high frequency modulated NFC carrier frequency signal to the NFC antenna 106.

At block 508, adjusting a modulation of the modulated NFC carrier frequency based upon the measured modulation characteristic is performed. For example, based upon the received feed-back (i.e., measured modulation characteristic), the NFC module 208 is configured to adjust the modulation index of the initial modulated NFC carrier frequency. The adjustment and/or compensation at the NFC controller side may be implemented for purposes of calibration and NFC Forum certification purposes.

In an implementation, the impedance loading of the NFC antenna 106 due to physical orientation and/or electrical characteristic of the coupling NFC card/tag 104 may be utilized to configure the power amplifier 402. That is, the power amplifier 402 may be configured to maintain its linearity for different electrical characteristics of the coupling NFC card/tag 104.

The following examples pertain to further embodiments:

In Example 1, a near field communication (NFC) device comprising: an antenna configured to receive a modulated NFC carrier frequency signal; a modulation detector coupled to the antenna, configured to detect a modulation characteristic of the received modulated NFC carrier frequency signal; an NFC controller configured to receive the detected modulation characteristic from the modulation detector, wherein the NFC controller is further configured to perform a calibration adjustment based on the detected modulation characteristic; and a connection that connects the NFC controller to the antenna.

Example 2 is the NFC device of Example 1, wherein the modulation characteristic includes a modulation index and a low-frequency baseband signal.

Example 3 is the NFC device of Example 1, wherein the connection is a frequency multiplexer that facilitates the low-frequency baseband signal to be fed-back to the NFC controller.

Example 4 is the NFC device of Example 1, wherein the calibration adjustment includes a compensation or an adjustment of the modulation characteristic.

Example 5 is the NFC device of any of Examples 1 to 4, wherein the NFC controller further comprises a modulation measurement diplexer configured to facilitate receiving of the detected modulation characteristic that includes a low-frequency baseband signal.

Example 6 is the NFC device of any of Examples 1 to 4, further comprising an RF matching network that matches an impedance of the antenna to an output impedance of the NFC controller, wherein the impedance of the antenna is based upon a physical orientation and an electrical characteristic of a coupling NFC tag or card.

Example 7 is the NFC device of any of Examples 1 to 4 further comprising a power amplifier disposed between the NFC controller and the antenna, wherein the power amplifier is calibrated by using a maximum impedance loading due to the coupling NFC tag or card.

Example 8 is the NFC device of Example 7, wherein the calibration of the power amplifier includes a linearity of operation at the maximum impedance.

Example 9 is the NFC device of any of Examples 1 to 4, wherein the connection is configured to pass multi-frequency bands.

In Example 10, a device comprising: an antenna that includes an impedance loading due to a coupling near field communication (NFC) card or tag; a modulation detector configured to detect a modulation index; a near field communications (NFC) module configured to receive a feedback detected modulation index, the NFC module comprising: a power amplifier configured to have a linear operation based on a maximum impedance loading at the antenna; and a modulation measurement diplexer configured to facilitate the receiving of the detected modulation index that is fed back by the modulation detector, wherein the NFC controller performs a calibration adjustment based on the detected modulation index; and a connection that connects the NFC module to the antenna, wherein the connection is configured to facilitate feeding back of the detected modulation index from the antenna to the NFC module.

Example 11 is the device of Example 10, wherein the modulation detector is configured to detect and demodulate a low-frequency baseband signal of a modulated NFC carrier frequency signal.

Example 12 is the device of Example 10, wherein the connection is a frequency multiplexer that facilitates the low-frequency baseband signal to be fed-back to the NFC module.

Example 13 is the device of any of Examples 10 to 12, wherein the calibration adjustment includes a compensation or an adjustment of the modulation index for a particular impedance loading at the antenna.

Example 14 is the device of any of Examples 10 to 12, wherein the maximum impedance loading is based upon a physical orientation and an electrical characteristic of a coupling NFC tag or card.

In Example 15, a method of near field communication (NFC) modulation calibration comprising: receiving a modulated NFC carrier frequency signal; measuring a modulation characteristic of the received modulated NFC carrier frequency signal; feeding back the measured modulation characteristic; and adjusting a modulation based on the measured modulation characteristic.

Example 16 is the method of Example 15, wherein the measuring of the modulation characteristic includes measuring a modulation index or demodulating a low-frequency baseband signal component of the received modulated NFC carrier frequency signal.

Example 17 is the method of any of Examples 15 to 16, wherein the feeding back of the measured modulation characteristic utilizes the same connection that is used to receive the modulated NFC carrier frequency signal.

Example 18 is the method of any of Examples 15 to 16, wherein the modulated NFC carrier frequency signal of about 13.56 MHz.

Example 19 is the method of any of Examples 15 to 16, wherein the adjusting the modulation includes adjustment of a modulation index of the modulated NFC carrier frequency signal.

Example 20 is the method of Example 19, wherein the adjustment of the modulation index is at least based upon a maximum impedance loading at an antenna, wherein the maximum impedance is due to a coupling NFC card or tag.

What is claimed is:

1. A near field communication (NFC) device comprising:
   an antenna configured to receive a modulated NFC carrier frequency signal;
   a modulation detector coupled to the antenna, wherein the modulation detector is configured to detect measure a modulation characteristic of the received modulated NFC carrier frequency signal;
   an NFC controller configured to receive the detected modulation characteristic from the modulation detector, wherein the NFC controller is further configured to perform a calibration adjustment based on the detected modulation characteristic;
   and a connection that connects the NFC controller to the antenna.

2. The NFC device of claim 1, wherein the modulation characteristic includes a modulation index and a low-frequency baseband signal.

3. The NFC device of claim 1, wherein the connection is a frequency multiplexer that facilitates the low-frequency baseband signal to be fed-back to the NFC controller.

4. The NFC device of claim 1, wherein the calibration adjustment includes a compensation or an adjustment of the modulation characteristic.

5. The NFC device of claim 1, wherein the NFC controller further comprises a modulation measurement diplexer configured to facilitate receiving of the detected modulation characteristic that includes a low-frequency baseband signal.

6. The NFC device of claim 1 further comprising an RF matching network that matches an impedance of the antenna to an output impedance of the NFC controller, wherein the impedance of the antenna is based upon a physical orientation and an electrical characteristic of a coupling NFC tag or card.

7. The NFC device of claim 1 further comprising a power amplifier disposed between the NFC controller and the antenna, wherein the power amplifier is calibrated by using a maximum impedance loading due to the coupling NFC tag or card.

8. The NFC device of claim 7, wherein the calibration of the power amplifier includes a linearity of operation at the maximum impedance.

9. The NFC device of claim 1, wherein the connection is configured to pass multi-frequency bands.

10. A device comprising: an antenna that includes an impedance loading due to a coupling near field communication (NFC) card or tag;
    a modulation detector coupled to the antenna and configured to measure a modulation index;
    a near field communications (NFC) module configured to receive a feedback detected modulation index, the NFC module comprising:
    a power amplifier configured to have a linear operation based on a maximum impedance loading at the antenna; and
    a modulation measurement diplexer configured to facilitate the receiving of the detected modulation index that is fed back by the modulation detector, wherein the NFC controller performs a calibration adjustment based on the detected modulation index; and
    a connection that connects the NFC module to the antenna, wherein the connection is configured to facilitate feeding back of the detected modulation index from the antenna to the NFC module.

11. The device of claim 10, wherein the modulation detector is configured to detect and demodulate a low-frequency baseband signal of a modulated NFC carrier frequency signal.

12. The device of claim 10, wherein the connection is a frequency multiplexer that facilitates the low-frequency baseband signal to be fed-back to the NFC module.

13. The device of claim 10, wherein the calibration adjustment includes a compensation or an adjustment of the modulation index for a particular impedance loading at the antenna.

14. The device of claim 10, wherein the maximum impedance loading is based upon a physical orientation and an electrical characteristic of a coupling NFC tag or card.

15. A method of near field communication (NFC) modulation calibration comprising:
    receiving a modulated NFC carrier frequency signal by an antenna;
    measuring a modulation characteristic of the received modulated NFC carrier frequency signal by a modulation detector that is coupled to the antenna;
    feeding back the measured modulation characteristic through a connection; and adjusting a modulation based on the measured modulation characteristic by an NFC controller.

16. The method of claim 15, wherein the measuring of the modulation characteristic includes measuring a modulation index or demodulating a low-frequency baseband signal component of the received modulated NFC carrier frequency signal.

17. The method of claim 15, wherein the feeding back of the measured modulation characteristic utilizes the same connection that is used to receive the modulated NFC carrier frequency signal.

18. The method of claim 15, wherein the adjusting the modulation includes adjustment of a modulation index of the modulated NFC carrier frequency signal.

19. The method of claim 18, wherein the adjustment of the modulation index is at least based upon a maximum impedance loading at an antenna, wherein the maximum impedance is due to a coupling NFC card or tag.

20. The method of claim 15, wherein the modulated NFC carrier frequency signal of about 13.56 MHz.

* * * * *